(12) United States Patent
Fukatani

(10) Patent No.: US 8,397,363 B2
(45) Date of Patent: Mar. 19, 2013

(54) BELT MOUNTING JIG

(75) Inventor: Toshifumi Fukatani, Yamatokoriyama (JP)

(73) Assignee: Gates Unitta Asia Company, Osaka (JP)

( * ) Notice: Subject to any disclaimer, the term of this patent is extended or adjusted under 35 U.S.C. 154(b) by 596 days.

(21) Appl. No.: 12/596,041

(22) PCT Filed: Feb. 5, 2008

(86) PCT No.: PCT/JP2008/051816
§ 371 (c)(1),
(2), (4) Date: Oct. 15, 2009

(87) PCT Pub. No.: WO2009/001574
PCT Pub. Date: Dec. 31, 2008

(65) Prior Publication Data
US 2010/0125995 A1    May 27, 2010

(30) Foreign Application Priority Data

Jun. 26, 2007 (JP) .................................. 2007-167515

(51) Int. Cl.
*B25B 27/14* (2006.01)
(52) U.S. Cl. ............................... 29/270; 269/1; 474/130
(58) Field of Classification Search .................. 269/1, 3, 269/6; 29/235, 244, 270; 474/119, 122, 474/130, 174
See application file for complete search history.

(56) References Cited

U.S. PATENT DOCUMENTS

| | | | | |
|---|---|---|---|---|
| 654,052 A * | 7/1900 | Cliff et al. | ...................... | 474/130 |
| 680,063 A * | 8/1901 | Montgomery et al. | ........ | 474/130 |
| 758,081 A * | 4/1904 | Kottusch | ........................ | 474/130 |
| 1,580,865 A * | 4/1926 | Stokowski | ..................... | 474/130 |
| 1,666,789 A * | 4/1928 | Pobanz | .......................... | 474/130 |
| 2003/0176248 A1* | 9/2003 | De Meester et al. | ........... | 474/130 |
| 2003/0211910 A1* | 11/2003 | Gerring et al. | ................. | 474/130 |
| 2004/0063530 A1* | 4/2004 | De Meester et al. | ........... | 474/130 |
| 2006/0009322 A1* | 1/2006 | Fletcher et al. | ................ | 474/130 |

FOREIGN PATENT DOCUMENTS

| | | | |
|---|---|---|---|
| DE | 103 37 204 A1 | | 3/2005 |
| DE | 10337204 A1 | * | 3/2005 |
| FR | 2 859 261 A1 | | 3/2005 |
| FR | 2859261 A1 | * | 3/2005 |
| FR | 2901592 A1 | * | 11/2007 |
| JP | 54-93756 A | | 7/1979 |
| JP | 2006-300172 A | | 11/2006 |
| JP | 2007-120678 A | | 5/2007 |
| JP | 2007120678 A | * | 5/2007 |

* cited by examiner

*Primary Examiner* — Lee D Wilson
*Assistant Examiner* — Tyrone V Hall, Jr.
(74) *Attorney, Agent, or Firm* — Birch, Stewart, Kolasch & Birch, LLP

(57) ABSTRACT

A holding surface 7 holding a portion of a belt 4 radially outwardly of a pulley flange 6 is formed on a belt mounting jig 1. A guide surface 8 guiding the belt 4 to the holding surface 7 is formed on the belt mounting jig 1. The guide surface 8 is formed into a curved shape bulging forwardly of the direction of rotation continuously from the holding surface 7. The belt mounting jig 1 is fixed to a small-diameter-side or low-load-side pulley 2. The belt 4 is wound around the belt mounting jig 1 and pulleys 2 and 3, and the large-diameter-side or high-load-side pulley 3 is rotated. The pulley 2 is rotated by a tension of the belt 4 guided in the rotating direction by the guide surface 8. The portion of the belt 4 slides in a direction along the pulley axis into a pulley groove 5.

5 Claims, 5 Drawing Sheets

BELT MOUNTING JIG

BACKGROUND OF THE INVENTION

1. Field of the Invention

The present invention relates to a belt mounting jig for mounting a belt extendable in a peripheral direction in a pulley groove while rotating a pulley having the pulley groove in its outer peripheral surface.

2. Description of the Related Art

In general, in a belt transmission mechanism having a belt wound around a pulley having a pulley groove in its outer peripheral surface, tension adjustment means such as a tension pulley is provided to give a predetermined belt tension to the belt after mounting the belt around the pulley.

In order to avoid such tension adjustment means, there is provided a belt which is extendable in a peripheral direction so as to stride over a pulley flange when mounted on a pulley. Further, Patent Document 1 discloses a belt mounting jig to fit a belt in a pulley groove by extending a belt in a peripheral direction to stride over a pulley flange while extending the belt in a peripheral direction.

FIG. 5 shows the belt mounting jig disclosed in Patent Document 1. A belt mounting jig 101 is used by being mounted on a pulley 102. A belt 104 is fitted in a pulley groove 103 at the rear of the belt mounting jig 101 in the direction of rotation of the pulley and is held by being put on a holding surface 105. Further, a tool is attached to a center bolt 106 of the pulley 102 to advance the belt mounting jig 101 forward in the pulley rotation direction by rotating the tool so that the region in the belt 104 fitted in the pulley groove 103 is gradually increased, thus mounting the belt 104 on the pulley 102. Patent Document 1: Japanese Patent Laid-Open No. 2006-300172 (paragraph Nos. 0028, 0035, 0036, 0043, 0044, FIG. 6).

SUMMARY OF THE INVENTION

Problems to be Solved by the Invention

With the belt mounting jig in Patent Document 1, a belt is mounted while a pulley to which the jig is attached is mounted being directly rotated by a tool or the like. When a belt is mounted on a pair of pulleys, the belt mounting jig is attached to the large-diameter-side or high-load-side pulley to enable the pulleys to be rotated by a smaller force or a stabilized force. However, the belt mounting jig cannot be attached to a certain pulley such as a small-diameter pulley at a back side in a dual groove set pulley. As a result, there is a possibility of the belt mounting jig being attached to a small-diameter-side or low-load-side pulley in a pair of pulleys. In such a case, the force required to rotate the pulleys is large or unstable and the difficulty in mounting the belt in the pulleys is correspondingly increased.

An object of the present invention is to provide a belt mounting jig with which a user can easily mount a belt on pulleys while mounting the belt mounting jig on a pulley on the small-diameter side, or on the low-load side.

Means for Solving the Problems

To achieve the above-described object, according to the present invention, there is provided a belt mounting jig for mounting a belt extendable in a peripheral direction in a pulley groove while rotating a pulley having the pulley groove at an outer peripheral surface, the belt mounting jig having fixing means for fixing the belt mounting jig to the pulley at least until the belt is fitted in the pulley groove; a holding surface which receives and holds a portion of the belt radially outwardly of an outer peripheral surface of a pulley flange and axially outwardly of a pulley axis until the belt is fitted in the pulley groove by sliding in a direction along the pulley axis; and a guide surface which guides the belt to the holding surface from outward of the pulley flange in the axial direction of the pulley axis and from forward of the direction of rotation of the pulley. Further, the guide surface is provided so as to project forwardly of the direction of rotation of the pulley relative to a straight line connecting the center of rotation of the pulley and the front end of the holding surface in the direction of rotation, and the pulley is rotated by a tension of the guided belt.

In the above-described arrangement, the guide surface is projected forwardly in the direction of rotation of the pulley to rotate the pulley by means of the tension of the belt guided by the guide surface and, therefore, there is no need to directly rotate, by a tool or the like, the pulley to which the belt mounting jig is attached.

That is, in a case where a belt is simply put on a holding surface, the belt passing a position in the vicinity of the center of rotation of a pulley is linearly directed to the holding surface, so that a belt tension acting on the holding surface is applied toward the vicinity of the center of rotation of the pulley and the pulley cannot be rotated. However, projecting the guide surface forwardly in the direction of rotation of the pulley enables the belt tension acting on the holding surface to be directed forwardly in the direction of rotation of the pulley to rotate the pulley. Thus, even in a case where the belt mounting jig is attached to a small-diameter-side or low-load-side pulley, the facility with which the belt is mounted can be improved to an extent corresponding to the elimination of the need for directly rotating the pulley.

The holding surface referred to herein is a surface in an area positioned axially outwardly of the pulley flange in the pulley axis direction and positioned radially outwardly of the outer peripheral surface of the pulley flange. The belt is fitted in the pulley groove at the rear of the holding surface in the pulley rotation direction and is passed outside the pulley in the axial direction at the front of the holding surface in the pulley rotation direction, thereby enabling the belt to be put on the pulley and the belt mounting jig without a tension. Further, when the pulley is rotated, the belt mounting jig also rotates peripherally by following the pulley and, therefore, the belt that passes outside the pulley in the direction along the pulley axis at the front of the belt mounting jig in the direction of rotation of the pulley moves radially outwardly and is fitted in the pulley groove by sliding so as to stride over the pulley flange when reaching a position outside the outer peripheral surface of the pulley flange in the radial direction.

If the guide surface is formed into a curved shape bulging forwardly of the direction of rotation of the pulley continuously from the holding surface, the pulley can be effectively rotated by smoothly guiding the belt to the holding surface while limiting a loss in the tension of the belt.

If a slanting surface for causing the belt to slide into the pulley groove is formed continuously from the holding surface, the belt can move easily from the holding surface into the pulley groove and the belt can be mounted more smoothly. Moreover, the slanting surface enables smooth transition from a portion of a belt, which is held on the holding surface, into a portion to be fitted in the pulley groove in the belt and also functions to prevent the portion fitted in the pulley groove from coming off.

As an example of the fixing means, a structure comprising an attachment hole which is fitted around a boss portion of the pulley and a projecting portion which projects from the holding surface so as to stride over the pulley flange to be fitted in the pulley groove may be mentioned. In this structure, the attachment hole limits the movement of the belt mounting jig in a direction perpendicular to the pulley axis and the projecting portion prevents the belt mounting jig from coming off in the direction along the pulley axis. This structure can prevent falling off of the belt mounting jig while enabling the belt mounting jig to be easily attached. As the fixing means, a different structure such as one including fastening of the pulley to a center bolt of the pulley with a nut may be alternatively adopted.

Further, if the attachment hole is provided as an elongated hole, such as to allow a shift of the projecting portion when the projecting portion is fitted in the pulley groove by striding over the pulley flange, the projecting portion can be easily fitted in the pulley groove at the time of attachment of the belt mounting jig and the facility with which the belt mounting jig is attached can be improved. Moreover, after putting the belt on the holding surface, the movement of the belt mounting jig along the longitudinal direction of the elongated hole is stopped by pressing with the belt, enabling prevention of falling off of the belt mounting jig.

If the belt mounting jig is fixed to one of a plurality of pulleys and the belt is mounted to one of the plurality of pulleys while rotating one of the plurality of pulleys by means of the belt by rotating another pulley around which the belt is wound, the belt can be mounted by rotating a large-diameter-side or high-load-side pulley with a tool or the like even in a case where the belt mounting jig is attached to a small-diameter-side or low-load-side pulley, for example. Therefore the force required for directly rotating the pulley with a tool or the like can be reduced or stabilized. In particular, any belt mounting jig cannot be attached in a case where the other pulley is a dual groove set pulley. In such a case, therefore, it is favorable to adopt the arrangement of the present invention.

Advantages of the Invention

According to the present invention, as described above, a pulley is rotated by a tension of a belt guided by the guide surface of the belt mounting jig. Therefore the belt can be mounted without directly rotating the pulley to which the belt mounting jig is attached. Thus, even when the belt mounting jig is attached, for example, to a small-diameter-side or low-load-side pulley in the case of attachment to a pair of pulleys, the belt can be mounted by rotating a large-diameter-side or high-load-side pulley. As a result, the force required to rotate the pulley can be reduced or stabilized and the facility with which the belt is mounted can be improved.

In particular, even if the belt mounting jig cannot be attached to the large-diameter-side or high-load-side pulley as in the case of a smaller-diameter pulley at a remoter side in a dual groove set pulley, the belt can be easily mounted by rotating the pulley with a reduced and stabilized force.

DESCRIPTION OF SYMBOLS

Figure 1:
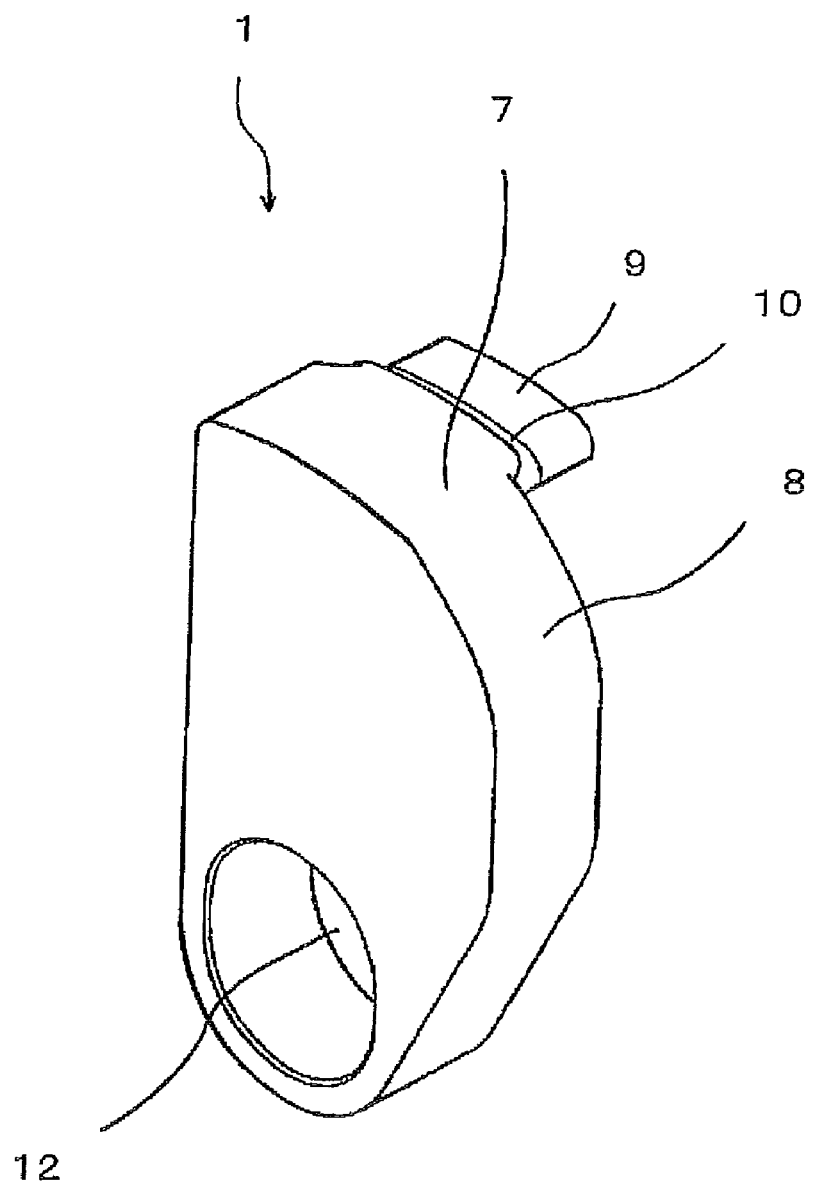
FIG. 1 is a perspective view of a belt mounting jig according to the present invention.

1 Belt mounting jig
2, 3 Pulley
4 Belt
5 Pulley groove
6 Pulley flange
7 Holding surface
8 Guide surface
9 Projecting portion
10 Slanting surface
11 Boss portion
12 Attachment hole
13 Center bolt
14 Tool

DETAILED DESCRIPTION OF THE INVENTION

Figure 2:
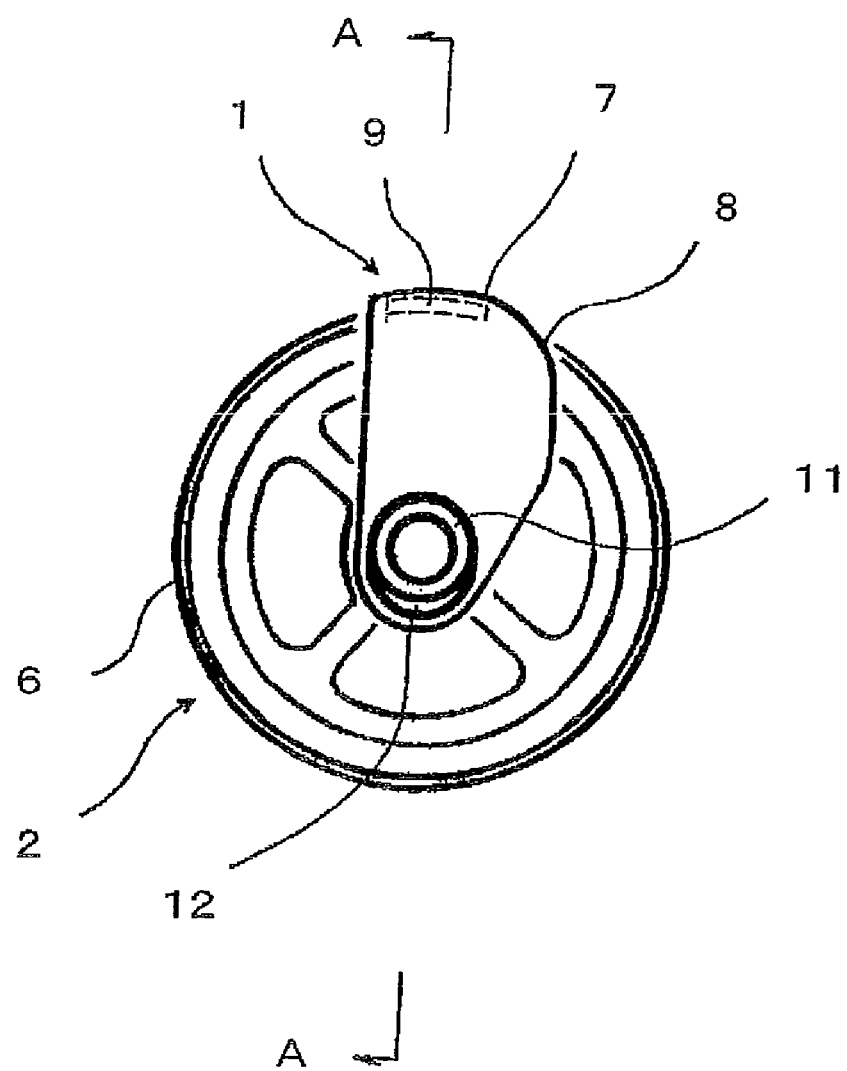
FIG. 2 is a front view of the belt mounting jig attached to a pulley.
Figure 3:
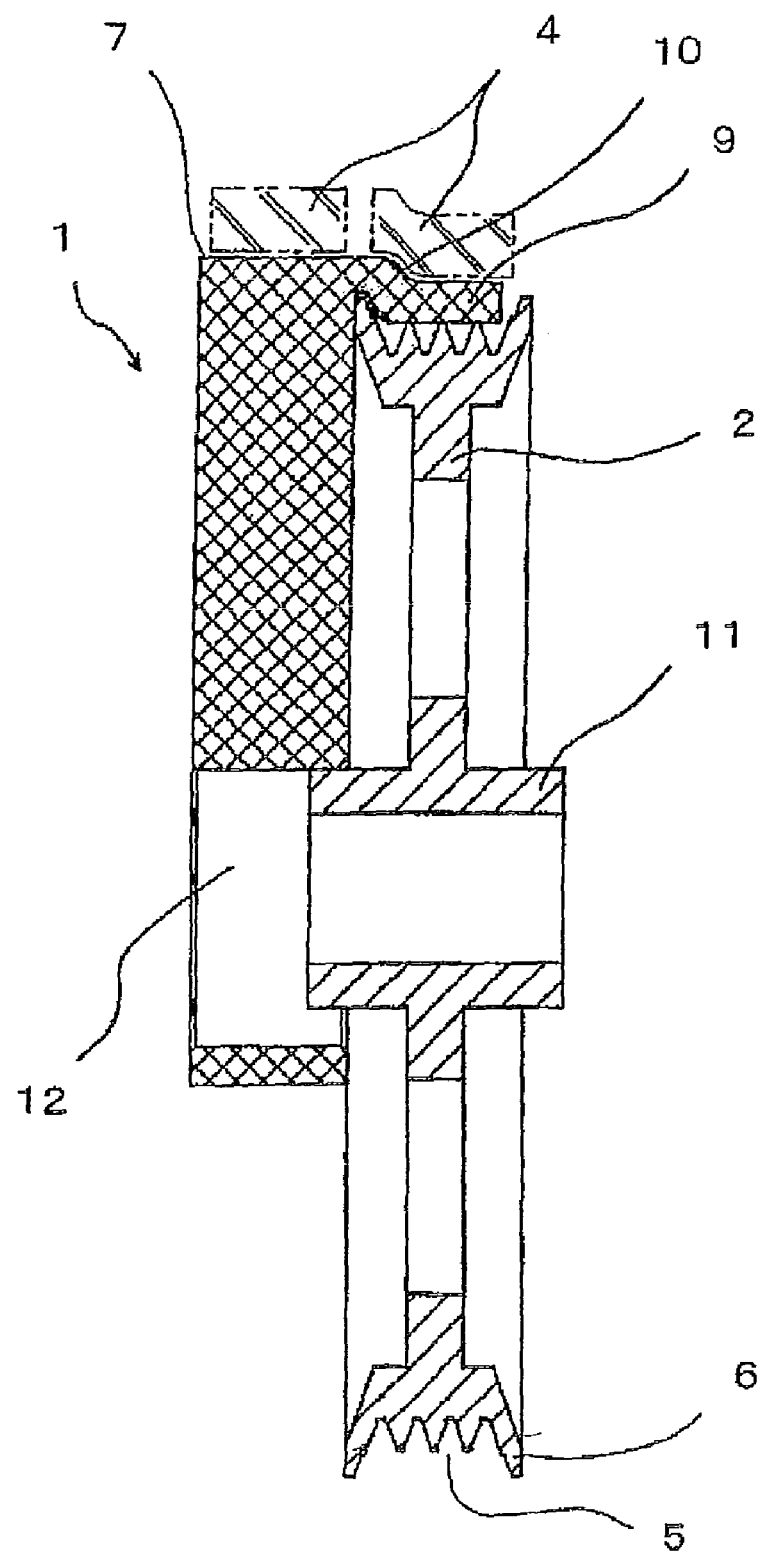
FIG. 3 is a sectional view taken along line A-A in FIG. 2.

A best mode for implementing a belt mounting jig according to the present invention will be described below with reference to the drawings. FIG. 1 is a perspective view of the belt mounting jig according to the present invention. FIG. 2 is a front view of the belt mounting jig attached to a pulley. FIG. 3 is a sectional view taken along line A-A in FIG. 2.

A belt mounting jig 1 is used, for example, by being attached to a pulley 2 in one of a pair of pulleys 2 and 3 on the outer side of the same in a direction along the axis of the pulley. The belt 4 is put on the belt mounting jig 1 and the other pulley 3 and the other pulley 3 is rotated. The pulley 2 is thereby rotated through the belt 4 and the belt mounting jig 1. While the pulleys are being rotated, the belt 4 is mounted in a pulley groove 5 formed in an outer peripheral surface of the pulley 2.

The belt mounting jig 1 is provided in the form of a generally elliptic thick plate and is attached by adjusting its longitudinal direction to a radial direction of the pulley 2, with its one end positioned in the vicinity of the center of rotation of the pulley 2 and the other end positioned in the vicinity of a pulley flange 6. The thickness of the belt mounting jig 1 is set to such a value that the belt 4 can be put on a peripheral surface. In the peripheral surface of the belt mounting jig 1, a holding surface 7 which receives and holds a portion of the belt 4 and a guide surface 8 which guides the belt 4 to the holding surface 7 are formed.

The holding surface 7 is an area in the peripheral surface of the belt mounting jig 1 positioned radially outwardly of an outer peripheral surface of the pulley flange 6. The holding surface 7 holds a portion of the belt 4 radially outwardly of the outer peripheral surface of the pulley flange 6 and axially outwardly of the pulley axis until the belt 4 extended with the rotation of the pulley 2 is fitted in the pulley groove 5 by sliding in a direction along the pulley axis so as to stride over the pulley flange 6. A projecting portion 9 which projects so as to stride over the pulley flange 6 to be fitted in the pulley groove 5 is formed continuously with the holding surface 7. By a slanting surface 10 formed on a base end portion of the projecting portion 9, the belt 4 is caused to slide into the pulley groove 5.

The guide surface 8 is formed into a curved shape bulging forwardly in the direction of rotation of the pulley 2 continuously from the holding surface 7. The guide surface 8 guides to the holding surface 7 the belt 4 that passes the front in the direction of rotation of the pulley 2 outside the pulley flange 6 in the direction along the pulley axis. The guide surface 8 bulges into a curved shape to project forwardly in the direction of rotation of the pulley 2 relative to a straight line connecting the center of rotation of the pulley 2 and the front end of the holding surface 7 in the direction of rotation. The guide surface 8 directs the guided belt 4 along the direction of rotation to rotate the pulley 2 by a tension of the belt 4.

An attachment hole 12 to be fitted around a boss portion 11 formed at a center of the pulley 2 is formed in the vicinity of one end of the belt mounting jig 1. The attachment hole 12 and the projecting portion 9 formed continuously from the holding surface 7 constitute fixing means for fixing the belt mounting jig 1 on the pulley 2. The fixing means limits the movement of the belt mounting jig 1 in a direction perpendicular to the pulley axis by the attachment hole 12 and limits the movement of the belt mounting jig 1 in the pulley axis direction by the projecting portion 9 fitted in the pulley groove 5.

The attachment hole 12 is formed as an elongated hole such as to allow the movement when the projecting portion 9 is fitted in the pulley groove 5 by striding over the pulley flange 6 at the time of attachment of the belt mounting jig 1. The movement of the belt mounting jig 1 in the major-diameter direction of the attachment hole 12 is limited by pressing the belt mounting jig 1 with the belt 4 after attachment to the pulley 2 and placement of the belt 4. Falling off of the belt mounting jig 1 as a result of coming off of the projecting portion 9 out of the pulley groove 5 is thereby prevented. Thus, the belt mounting jig 1 is fixed on the pulley 2 until the belt 4 is fitted in the pulley groove 5.

The pulleys 2 and 3 are rotatably supported on pulley axes inserted in the boss portions 11. For example, a plurality of grooves are formed in the pulley groove 5 for winding of a V-ribbed belt. In the pulleys 2 and 3, the pulley 3 is of a larger diameter or a higher load in comparison with the pulley 2. Also, the belt mounting jig 1 cannot be attached to the pulley 3, as in the case of a small-diameter pulley at a back side in a dual groove set pulley.

The belt 4 is made extendable in a peripheral direction to eliminate the need for tension adjustment means such as a tensioner. For example, a structure in which a core cord made of polyamide is embedded in the belt body may be adapted to set the elongation in the peripheral direction to 2 to 3%. While a V-ribbed belt is mentioned as the belt 4, the belt 4 may be a flat belt or the like other than the V-ribbed belt.

Figure 4:
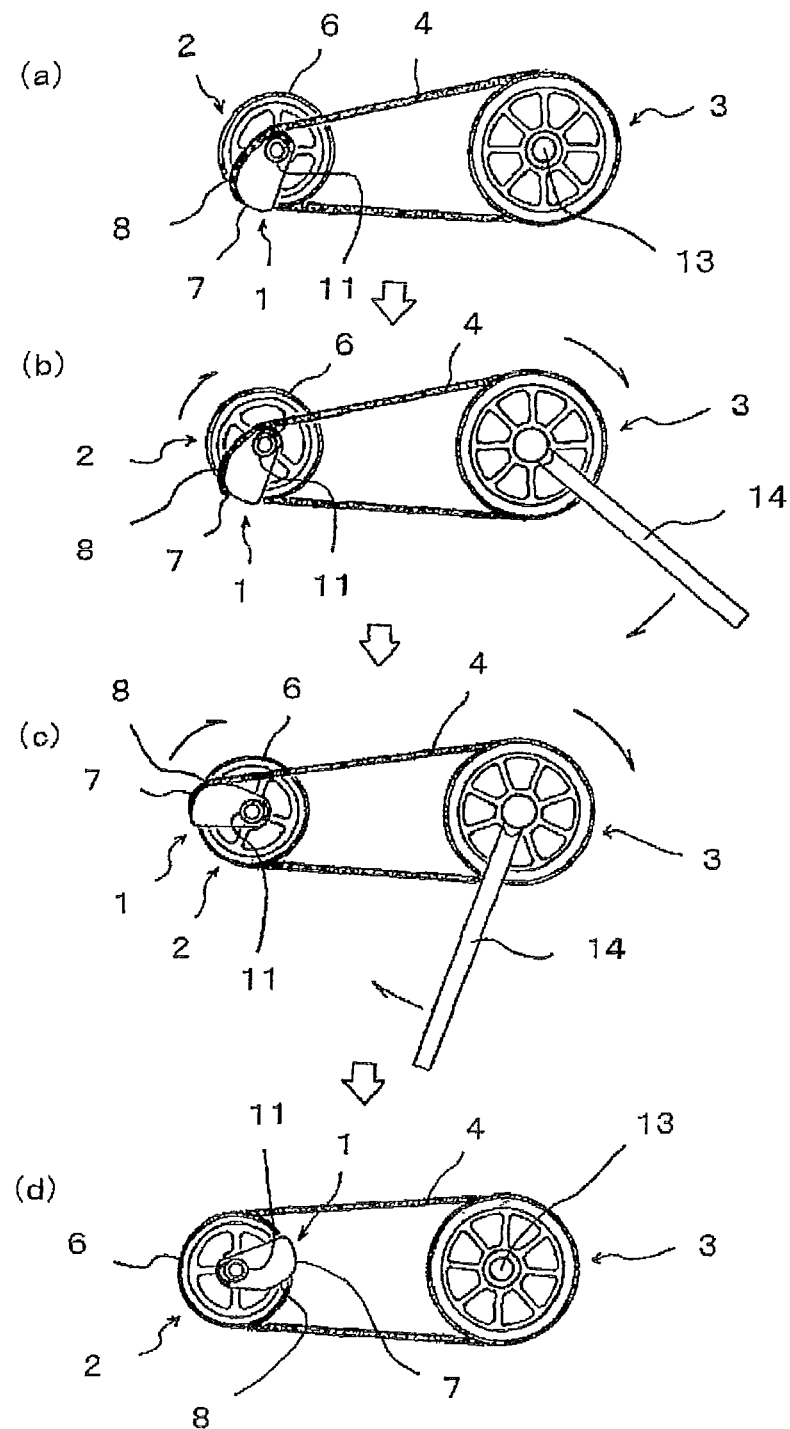
FIG. 4 is a diagram showing the procedure of mounting the belt on a pair of pulleys by using the belt mounting jig.
Figure 5:
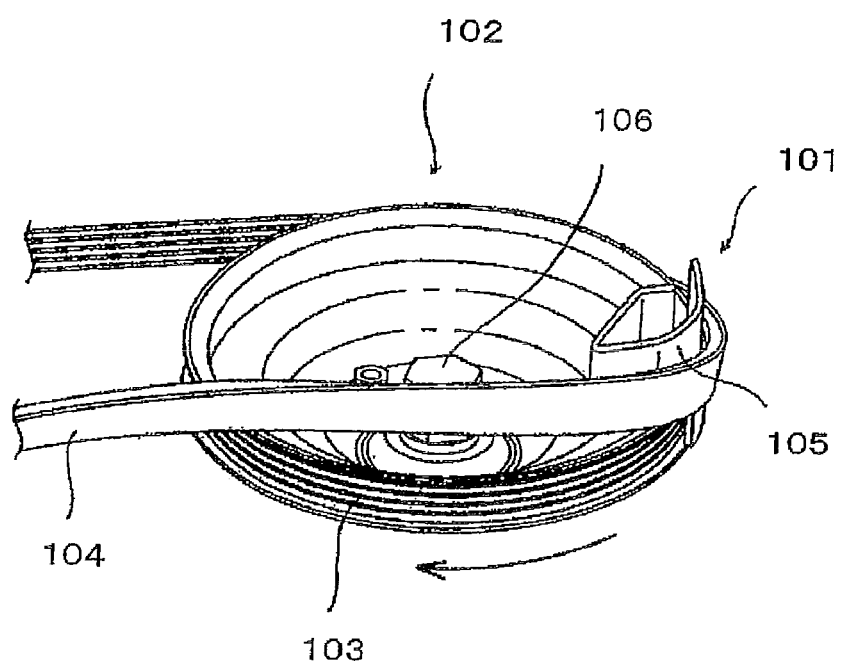
FIG. 5 is a perspective view of a conventional belt mounting jig.

The procedure of mounting the belt 4 on the pair of pulleys 2 and 3 by using the belt mounting jig 1 will next be described. FIG. 4 is a diagram showing the procedure of mounting the belt on the pair of pulleys with the belt mounting jig.

First, as shown in FIG. 4(*a*), the belt mounting jig 1 is attached to the small-diameter-side pulley 2, and the belt mounting jig 1 is positioned rearwardly of a line connecting the centers of rotation of the pulleys 2 and 3 by suitably rotating the pulley 2. When the belt mounting jig 1 is attached to the pulley 2, the attachment hole 12 is fitted around the boss 11 of the pulley 2 and, in this state, the belt mounting jig 1 is moved in the major-diameter direction of the attachment hole 12, thereby causing the projecting portion 9 to stride over the pulley flange 6 to be fitted and fixed in the pulley groove 5.

Also, the belt 4 is wound around the large-diameter-side pulley 3 and is fitted in the pulley groove 5 rearwardly of the belt mounting jig 1 in the pulley rotation direction in the pulley 2. Further, in the vicinity of the belt mounting jig 1, the belt 4 is bent in a belt width direction and is placed along the slanting surface 10 of the projecting portion 9 so as to stride over the pulley flange 6. The belt 4 is put on the holding surface 7 and the guide surface 8 of the belt mounting jig 1 so that the belt 4 extends outwardly of the pulley 2 in the pulley axis direction at the front of the belt mounting jig 1 in the pulley rotation direction. In this state, no tension is exerted on the belt 4 and the belt 4 can be easily put on the belt mounting jig 1 and the pulleys 2 and 3.

Next, as shown in FIGS. 4(*b*) and 4(*c*), a tool 14 on the market for example is attached to a center bolt 13 of the large-diameter-side pulley 3 to rotate the pulley 3, thereby rotating the pulley 2 through the belt 4 and the belt mounting jig 1. At this time, the belt 4 is guided in the direction of rotation of the pulley 2 by the guide surface 8 and, therefore, the pulley 2 can be rotated by the tension of the belt 4. Also, the large-diameter-side pulley 3 is rotated on the driving side to rotate the small-diameter-side pulley 2 on the driven side. Therefore, the force required for rotation can be reduced.

The belt mounting jig 1 is thereby advanced forward in the pulley rotation direction while extending the belt 4, so that the region in the belt 4 fitted in the pulley groove 5 is increased. At this time, a reaction force of the belt acts on the holding surface 7 to press the belt mounting jig 1. The movement in the major-diameter direction of the attachment hole 12 is thereby stopped to prevent falling off of the belt mounting jig 1 at least before the belt 4 is fitted in the pulley groove 5 and to enable a one-handed belt mounting operation.

Since the movement of the belt 4 in the pulley axis direction is limited by fitting the belt 4 in the pulley groove 5 rearwardly of the belt mounting jig 1 in the pulley rotation direction, a force to move the belt 4 toward the pulley groove 5 due to the restitutive force of the belt 4 bent in the belt width direction acts at the front in the pulley rotation direction. The restitutive force of the belt 4 comprises a thrust force as a component of the belt tension and the elastic force of the belt 4.

The belt 4 is moved radially outwardly from the vicinity of the center of the pulley 2 in front of the belt mounting jig 1 in the pulley rotation direction to be gradually brought closer to the outer edge of the pulley flange 6. The belt 4 is thereafter slid on the slanting surface 10 and the projecting portion 9 from the holding surface 7 by the restitutive force of the belt 4 so as to stride over the pulley flange 6. The belt 4 is thereby fitted in the pulley groove 5 and completely mounted on the pulley 2, as shown in FIG. 4(*d*).

After the belt 4 has been completely mounted on the pulley 2, no reaction from the belt 4 acts on the holding surface 7, so that the belt mounting jig 1 is again made movable along the larger-diameter direction of the attachment hole 12. Easy detachment of the belt mounting jig 1 by disengaging the projecting portion 9 from the pulley groove 5 is thereby enabled.

INDUSTRIAL APPLICABILITY

The belt mounting jig according to the present invention is capable of mounting a belt with a small stabilized force by rotating a high-load-side pulley and can therefore be favorably adopted particularly in a case where a belt is mounted on a high-load-side pulley such as a crank pulley and a low-load-side pulley such as a pulley for an air conditioner, and where the belt mounting jig cannot be attached to the high-load-side pulley, as in the case of a small-diameter pulley at a back side in a dual groove set pulley.

The invention claimed is:
1. A belt mounting jig for mounting a belt extendable in a peripheral direction in a pulley groove while rotating a pulley having the pulley groove at an outer peripheral surface, comprising:
a fixing unit that fixes the belt mounting jig to the pulley at least until the belt is fitted in the pulley groove;

a holding surface which receives and holds a portion of the belt radially outwardly of an outer peripheral surface of a pulley flange and axially outwardly of a pulley axis until the belt is fitted in the pulley groove by sliding in a direction along the pulley axis;

a guide surface which guides the belt to the holding surface from outward of the pulley flange in the axial direction of the pulley axis and from forward of the direction of rotation of the pulley; and a projecting portion projecting from the holding surface so as to stride over the pulley flange to be fitted in the pulley groove, an outer surface of the projecting portion being parallel with the holding surface and stepped downward with respect to the holding surface, and an inner surface of the projecting portion defining a recess that engages a pulley flange of the pulley, wherein the guide surface is provided projecting forwardly of the direction of rotation of the pulley relative to a straight line connecting the center of rotation of the pulley and the front end of the holding surface in the direction of rotation so as to rotate the pulley by a tension of the guided belt, and wherein the fixing unit includes an elongated hole fitted around a boss portion of the pulley so as to allow the projecting portion to shift in a radial direction of the pulley, such that the recess disengages from the pulley flange by shifting the belt mounting jig in the radial direction.

2. The belt mounting jig according to claim 1, wherein the guide surface is formed into a curved shape bulging forwardly of the direction of rotation of the pulley continuously from the holding surface.

3. The belt mounting jig according to claim 1, wherein a slanting surface that extends between the holding surface and the outer surface of the projecting portion for causing the belt to slide into the pulley groove is formed continuously from the holding surface.

4. A method of mounting a belt to a first pulley, such that the belt extends between the first pulley and a second pulley, the method comprising:

providing a belt mounting jig comprising:

a fixing unit that fixes the belt mounting jig to the pulley at least until the belt is fitted in the pulley groove;

a holding surface which receives and holds a portion of the belt radially outwardly of an outer peripheral surface of a pulley flange and axially outwardly of a pulley axis until the belt is fitted in the pulley groove by sliding in a direction along the pulley axis;

a guide surface which guides the belt to the holding surface from outward of the pulley flange in the axial direction of the pulley axis and from forward of the direction of rotation of the pulley; and a projecting portion projecting from the holding surface so as to stride over the pulley flange to be fitted in the pulley groove, an outer surface of the projecting portion being parallel with the holding surface and stepped downward with respect to the holding surface, and an inner surface of the projecting portion defining a recess that engages a pulley flange of the pulley, wherein the guide surface is provided projecting forwardly of the direction of rotation of the pulley relative to a straight line connecting the center of rotation of the pulley and the front end of the holding surface in the direction of rotation so as to rotate the pulley by a tension of the guided belt, and wherein the fixing unit includes an elongated hole fitted around a boss portion of the pulley so as to allow the projecting portion to shift in a radial direction of the pulley, such that the recess disengages from the pulley flange by shifting the belt mounting jig in the radial direction;

fixing the belt mounting jig to the first pulley; and mounting the belt to the first pulley by rotating the first pulley together with the belt mounting jig by rotating the second pulley around which the belt is wound.

5. The method according to claim 4, wherein the second pulley is a dual groove set pulley.

* * * * *